(12) United States Patent
Meier et al.

(10) Patent No.: US 7,478,841 B2
(45) Date of Patent: Jan. 20, 2009

(54) RAPID COUPLING

(75) Inventors: Ulrich Meier, Waedenswil (CH); Hans Greminger, Horgen (CH)

(73) Assignee: Hans Oetiker AG Maschinen - Und Apparatefabrik, Horgen (CH)

( * ) Notice: Subject to any disclaimer, the term of this patent is extended or adjusted under 35 U.S.C. 154(b) by 0 days.

(21) Appl. No.: 10/578,678

(22) PCT Filed: Nov. 11, 2003

(86) PCT No.: PCT/EP03/12599

§ 371 (c)(1),
(2), (4) Date: Dec. 8, 2006

(87) PCT Pub. No.: WO2005/052431

PCT Pub. Date: Jun. 9, 2005

(65) Prior Publication Data

US 2007/0176421 A1    Aug. 2, 2007

(51) Int. Cl.
*F16L 37/088*    (2006.01)
*F16L 37/22*    (2006.01)
(52) U.S. Cl. ..................................... 285/321
(58) Field of Classification Search ................. 285/318, 285/316, 317
See application file for complete search history.

(56) References Cited

U.S. PATENT DOCUMENTS

| | | | |
|---|---|---|---|
| 2,129,704 A * | 9/1938 | Meyer | 285/33 |
| 2,805,089 A * | 9/1957 | Hansen | 285/317 |
| 2,848,255 A * | 8/1958 | Klein et al. | 285/267 |
| 3,934,315 A * | 1/1976 | Millheiser et al. | 24/453 |
| 4,541,658 A * | 9/1985 | Bartholomew | 285/319 |
| 4,800,925 A * | 1/1989 | Yeoman | 138/46 |
| 4,802,696 A * | 2/1989 | Chohan et al. | 285/317 |
| 4,936,544 A * | 6/1990 | Bartholomew | 251/149.6 |
| 5,098,136 A * | 3/1992 | Washizu | 285/319 |
| 5,100,182 A * | 3/1992 | Norkey et al. | 285/318 |
| 5,328,215 A * | 7/1994 | Grenier | 285/318 |
| 5,338,002 A * | 8/1994 | McNaughton et al. | 251/149.6 |
| 5,570,910 A | 11/1996 | Highlen | |
| 6,347,815 B1 * | 2/2002 | Kargula et al. | 285/345 |
| 6,390,511 B1 * | 5/2002 | Kargula | 285/308 |

FOREIGN PATENT DOCUMENTS

| | | |
|---|---|---|
| DE | 12 47 087 B | 8/1967 |
| DE | 195 43 567 A | 5/1996 |
| DE | 196 23 995 A | 12/1997 |

* cited by examiner

*Primary Examiner*—James M Hewitt
(74) *Attorney, Agent, or Firm*—Barnes & Thornburg LLP

(57) ABSTRACT

In a rapid coupling, an end section of a pipe nipple engages in a throughhole of a sleeve. A groove provided on the pipe nipple serves to engage a resilient locking ring formed in the sleeve in order to lock the coupled state. The locking ring is located in an annular recess formed close to the insertion end of the sleeve. If the pipe nipple is not inserted into the bush to such an extent that the locking ring latches in the groove, the pipe nipple is pushed outward by a compression spring provided in the throughhole of the sleeve, so that the groove is readily visible outside the sleeve. The groove thus serves not only for locking in the properly coupled state but also as an indicator for indicating a state which is not properly coupled.

5 Claims, 2 Drawing Sheets

RAPID COUPLING

A rapid coupling is disclosed in EP 0 467 381 A1. An engagement section is provided on the pipe nipple in the form of an annular bead or groove which cooperates with a resilient locking element disposed inside the sleeve in such a way that the pipe nipple is retained in the sleeve by engagement between the locking element and the engagement section.

When the pipe nipple is pushed into the sleeve, latching takes place between the locking element and the engagement which is as such audible and tangible. However, if mounting is done automatically or under unfavorable working conditions, audible or tangible latching as an indicator of a complete locking has to be ruled out. Also in a subsequent inspection, the locking state can only be checked by trying to pull the pipe nipple out of the sleeve, which is labor-intensive and is not readily possible in the case of fully assembled machines.

SUMMARY OF THE INVENTION

A general object of the invention is to overcome, at least in part, disadvantages as occur in comparable rapid couplings of the prior art. A more specific object of the invention may be seen in providing a rapid coupling in which the locking state between the pipe nipple and the sleeve can easily be ascertained.

This object is met by the present rapid coupling. The engagement section (groove or projection) is outside the sleeve and is thus visible when the pipe nipple and the sleeve are not properly coupled and thus not locked. Thus, the engagement section, in addition to its actual latching function with the locking element, assumes the additional task as an indicator of the locking state of the rapid coupling.

The compression spring again serves a double purpose, namely to bias the engagement between the locking element of the sleeve and the engagement section of the pipe nipple toward a defined position, on the one hand, and to ensure that the pipe nipple is pushed out of the sleeve in the unlocked state, so that the engagement section reliably fulfils the said indicator function, on the other hand.

The present locking mechanisms, which are uncomplicated in production, ensure reliable locking and yet allow simple uncoupling.

BRIEF DESCRIPTION OF THE DRAWING

Embodiments of the invention are explained in more detail below with reference to the drawing, in which.

DETAILED DESCRIPTION OF EMBODIMENTS

Figures 1, 3:
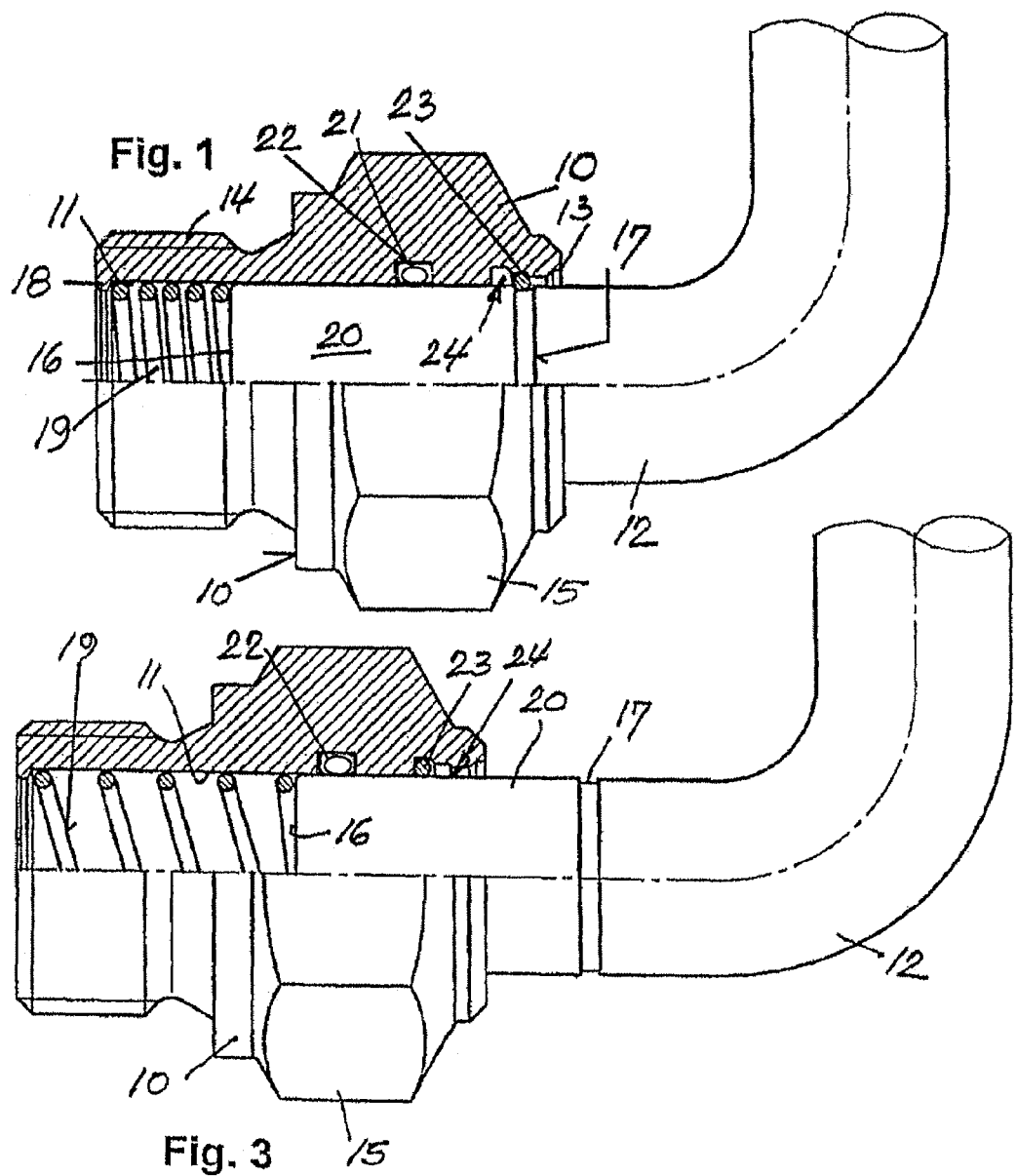
FIG. 1 shows a rapid coupling, partly in axial section, in the coupled and locked state.
FIG. 3 shows the same coupling in the pushed-together, but not yet locked state.

The rapid coupling shown in FIG. 1 comprises a sleeve 10 having a through-hole 11 and a pipe nipple 12 which can be inserted into said sleeve 10 and is to be coupled to the sleeve. The sleeve 10 is provided, at its end remote from the insertion end 13 for the pipe nipple 12, with an external thread 14 for screwing into a machine housing, for example a motor-vehicle engine block and, on a further part of its outer surface, with a hexagon 15. Instead of a screw connection, the sleeve 10 may be formed as an insert part to be inserted into a corresponding hole of the machine housing and fastened therein by material displacement, as described in EP 0 467 381 A1.

Figure 2:
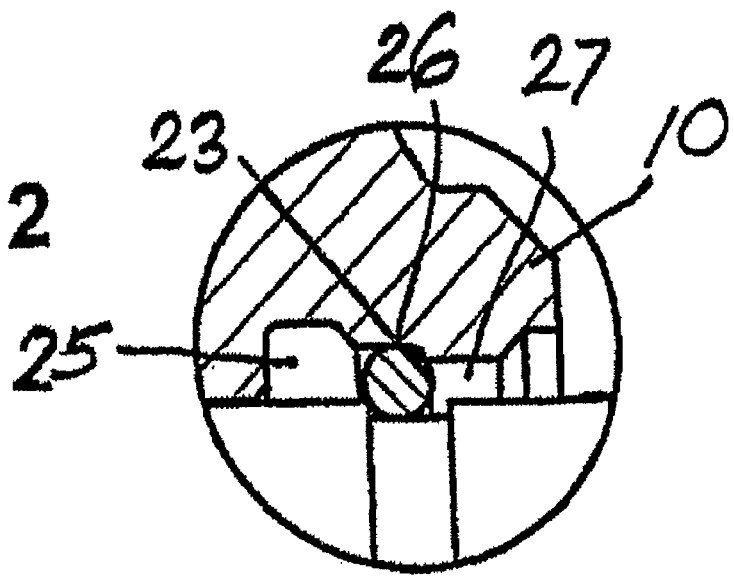
FIG. 2 is an enlarged detailed view of the locking region of the rapid coupling according to FIG. 1.

The pipe nipple 12 is of cylindrical shape over its length to be inserted into the sleeve 10 and, in the embodiment of FIGS. 1 to 3, has an annular recess or groove 17 at some distance from its insertion end 16. In the embodiment shown, the pipe nipple 12 is curved outside the sleeve 10.

A helical compression spring 19 is disposed between the insertion end 16 of the pipe nipple 12 and an annular stop 18 formed in the interior of the throughhole 11 of the sleeve 10, the outer diameter of the compression spring 19, in the compressed state, being approximately equal to the inner diameter of the throughhole 11. In the embodiment shown, the stop 18 is located at the end of the sleeve 10 remote from the insertion end 13.

Furthermore, the sleeve 10, in the region where the cylindrical section 20 between the insertion end 16 and the groove 17 of the pipe nipple 12 is located in the coupled state, has an annular recess 21 into which a sealing O-ring 22 is inserted.

Serving to lock the pipe nipple 12 in the sleeve 10 in the coupling state shown in FIGS. 1 and 2, is a locking ring 23 which is resilient in the radial direction, is split in the circumferential direction, and is dimensioned in such a way that its inner diameter in the released state is smaller than the outer diameter of the pipe nipple 12. The locking ring 23 is located in an annular recess 24 which is formed in the sleeve 10 close to its insertion end 13 and has three successive regions 25 . . . 27 of different diameters.

The inner region 25 has an inner diameter which is slightly larger than the diameter of the pipe nipple 12 plus twice the radial thickness of the locking ring 23. The inner diameter of the center region 26 of the annular recess 24 corresponds to the outer diameter of the groove 17 provided in the pipe nipple 12 plus twice the radial thickness of the locking ring 23. The inner diameter of the outer region 27 of the annular recess 24 is smaller than that of the center region 26.

If the pipe nipple 12 with its end section 20 is pushed sufficiently far into the throughhole 11 of the sleeve 10, the groove 17 formed in the pipe nipple 12 passes into the region of the annular recess 24 provided in the sleeve 10, and the locking ring 23 enters the groove 17 in which it latches in place due to its bias.

When the pipe nipple 12 is released, the compression spring 19, which is compressed when said pipe nipple 12 is being pushed in, seeks to push the pipe nipple 12 outward, the locking ring 23 being urged into the center region 26 of the annular recess 24 until it abuts against the step between the center region 26 and the outer region 27 of the annular recess 24 in the position shown in FIG. 2. This is the fully coupled and locked position, in which the groove 17 of the pipe nipple is located completely within the sleeve 10.

An unlocking tool consisting of two tubular halves, which may have the form shown in FIG. 12 of EP 0 467 381 A1 and is not shown here, may be used for releasing the coupling. The two tubular halves of this tool are so dimensioned that they can be passed through the gap between the outer region 27 of the annular recess 24 and the outside of the pipe nipple 12. If the pipe nipple 12 is then pushed inward against the force of the compression spring 19 until the locking ring 23 faces the wider, inner region 25 of the annular recess 24, the locking ring 23 can be lifted out of the groove 17 of the pipe nipple by means of the tool, whereupon the pipe nipple 12 can be pulled out of the throughhole 11 of the sleeve 10.

As shown in FIG. 1 of EP 0 467 381 A1, the unlocking tool may have the form of a sleeve movable on the pipe nipple and having a wall thickness corresponding to the gap between the outer region 27 of the annular recess 24 and the outside of the pipe nipple 12. In order not to damage the coupling, such a sleeve is preferably made of plastic.

In the state shown in FIG. 3, the end section 20 of the pipe nipple 12 is still in the sleeve 10, and the O-ring 22 may bear against the end section 20 and effect a seal. In this state, however, the coupling is not locked, so that an unintentional relative movement between the sleeve 10 and the pipe nipple 12 may lead to leakage or even to complete release of the coupling. This non-locked condition can be readily recognized visually, with the naked eye or by means of an imaging device, because the groove 17 of the pipe nipple 12 is visible outside the sleeve 10.

Figure 4:
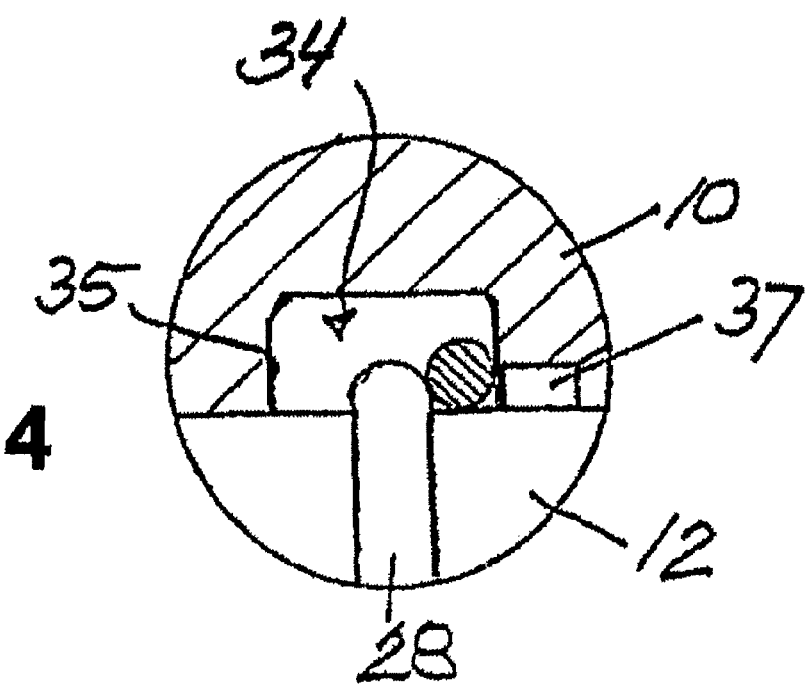
FIG. 4 is an illustration similar to FIG. 1 of a rapid coupling with a locking arrangement of different design.

In the second embodiment shown in FIG. 4, the pipe nipple 12, instead of having the groove, has a projection 28 which can be formed, for example, as an annular bead by axial upsetting of the pipe nipple. In this case, the annular recess 34 provided in the sleeve 10 has two regions 35, 37, the inner diameter of the inner region 35 being slightly larger than the outer diameter of the annular bead 28 plus twice the radial thickness of the locking ring 23. The inner diameter of the outer region 37 of the annular recess 34 corresponds to the outer diameter of the bead 28; to be precise, it is only slightly larger than the latter, so that the pipe nipple 12 can easily be inserted. The outer region 37 and the outer surface of the pipe nipple 12 form a gap for inserting the above mentioned unlocking tool.

When the end section 20 of the pipe nipple 12 is pushed in against the force of the compression spring 19, the locking ring 23, held in place by the inner end face of the annular-recess region 35, is lifted over the annular bead 28. When the pipe nipple 12 is released, the compression spring 19 causes the locking ring 23 to be pressed against the opposite end face of the annular-recess region 35 by the bead 28 and the locking is effected.

If the pipe nipple 12 is not inserted sufficiently far into the sleeve so that no locking is not achieved, the compression spring 19 pushes the pipe nipple 12 out of the bush 10 to such an extent that the annular bead 28 remains visible outside the bush.

Since the annular locking recess 24 or 34 in both embodiments is located in direct proximity to the insertion end 13 of the bush 10, the groove 17 or bead 28 is visible outside the sleeve 10 if no latching is effected. The groove 17 or bead 28 may be located, however, close to the insertion end 13 of the sleeve 10.

The compression spring 19, which defines the latched locking position shown in FIGS. 1, 2 and 4, is so dimensioned that, in the unlocked state, it pushes the pipe nipple 12 out of the sleeve 10 to such an extent that the groove 17 or bead 28 is located at some distance from the insertion end 13 of the sleeve 10 and is therefore in any case clearly visible.

The invention claimed is:

1. A rapid coupling comprising:
    a sleeve having an inner stop and an insertion end;
    a pipe nipple having an insertion end adapted to be inserted into the sleeve's insertion end and having an outer surface formed with an engagement section;
    a locking element provided in the sleeve at the insertion end of the sleeve, the locking element, upon engagement with the engagement section, retaining the nipple in the sleeve to constitute a coupled state of the coupling;
    a compression spring disposed between the inner stop of the sleeve and the insertion end of the nipple
    wherein the position of the locking element and the engagement section and the strength of the compression spring are such that in an uncoupled state of the coupling, the compression spring pushes the nipple out of the sleeve to such an extent that the engagement section is outside the sleeve; and
    wherein the engagement section of the nipple is formed as a groove, and a recess is provided in the sleeve, the recess having three successive regions with diameters decreasing in an axial direction toward the insertion end of the sleeve, the diameter of an inner one of the regions being at least equal to the outer diameter of the nipple plus twice the radial thickness of the locking element, and the diameter of a center region corresponding to the diameter of the groove plus twice the radial thickness of the locking element.

2. The rapid coupling of claim 1, wherein the diameter of an outer one of the regions of the recess is larger than the outer diameter of the nipple to leave a gap between the nipple and the sleeve for an unlocking tool to be inserted.

3. The rapid coupling of claim 1, wherein the locking element is a resilient retaining ring having an inner diameter which, in a relieved state of the retaining ring, is smaller than the outer diameter of the nipple.

4. A rapid coupling comprising:
    a sleeve having an inner stop and an insertion end;
    a pipe nipple having an insertion end adapted to be inserted into the sleeve's insertion end and having an outer surface formed with an engagement section;
    a locking element provided in the sleeve at the insertion end of the sleeve, the locking element, upon engagement with the engagement section, retaining the nipple in the sleeve to constitute a coupled state of the coupling; and
    a compression spring disposed between the inner stop of the sleeve and the insertion end of the nipple
    wherein the position of the locking element and the engagement section and the strength of the compression spring are such that in an uncoupled state of the coupling, the compression spring pushes the nipple out of the sleeve to such an extent that the engagement section is outside the sleeve and wherein the engagement section of the nipple is formed as a projection, and a recess having two successive regions is provided in the sleeve, the diameter of an outer one of the regions adjoining the insertion end of the sleeve corresponding to an outer diameter of the projection, and the diameter of the inner one of the regions being at least equal to the outer diameter of the projection plus twice the radial thickness of the locking element.

5. The rapid coupling of claim 4, wherein the locking element is a resilient retaining ring having an inner diameter which, in a relieved state of the retaining ring, is smaller than the outer diameter of the projection of the nipple.

* * * * *